US011598690B2

(12) United States Patent
Huang et al.

(10) Patent No.: US 11,598,690 B2
(45) Date of Patent: Mar. 7, 2023

(54) APPARATUS FOR DETECTING AIR TIGHTNESS

(71) Applicant: Contemporary Amperex Technology Co., Limited, Ningde (CN)

(72) Inventors: Linjun Huang, Ningde (CN); Darning Zhou, Ningde (CN); Zhiju Ma, Ningde (CN); Gaoning Chen, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 325 days.

(21) Appl. No.: 17/134,567

(22) Filed: Dec. 28, 2020

(65) Prior Publication Data

US 2021/0116324 A1    Apr. 22, 2021

Related U.S. Application Data

(63) Continuation of application No. PCT/CN2020/101675, filed on Jul. 13, 2020.

(30) Foreign Application Priority Data

Aug. 9, 2019    (CN) .......................... 201921291912.3

(51) Int. Cl.
*G01M 3/26*    (2006.01)
*F16K 37/00*   (2006.01)

(52) U.S. Cl.
CPC ........... *G01M 3/26* (2013.01); *F16K 37/0091* (2013.01)

(58) Field of Classification Search
CPC ......... G01M 3/26; G01M 3/3263; G01M 3/34
(Continued)

(56) References Cited

U.S. PATENT DOCUMENTS 4,993,256 A * 2/1991 Fukuda ............... G01M 3/3236
                                                     340/605
5,059,348 A * 10/1991 Guelta .................... C06D 3/00
                                                      73/40
(Continued)

FOREIGN PATENT DOCUMENTS

CN        2676170 Y     2/2005
CN      201917443 U     8/2011
(Continued)

OTHER PUBLICATIONS

ESPACENET Machine Translation of CN 107228745 A Which Originally Published on Oct. 3, 2017. (Year: 2017).*
(Continued)

*Primary Examiner* — David A. Rogers
(74) *Attorney, Agent, or Firm* — East IP P.C.

(57) ABSTRACT

Embodiments of the present application disclose an apparatus for detecting air tightness. The apparatus has an air inlet end, an inflating end for an object to be tested inflating end and a standard part inflating end. The apparatus includes a pressure regulating component, a first bypass isolating valve, a second bypass isolating valve, a third bypass isolating valve, a first high air pressure sensor, a second high air pressure sensor, a low air pressure sensor, and a differential pressure sensor. By adopting the technical solutions according to the embodiments of the present application, a low air pressure sensor can be embedded in an air tightness detector suitable for tests under high pressure and the low air pressure sensor can be effectively protected in a high pressure environment, so that leakage tests under different inflation pressures can be implemented by one instrument.

10 Claims, 3 Drawing Sheets

(58) Field of Classification Search
USPC .................................................. 73/40–49.8
See application file for complete search history.

(56) References Cited

U.S. PATENT DOCUMENTS

| | | | | |
|---|---|---|---|---|
| 5,412,978 A * | 5/1995 | Boone | ............... | G01M 3/3254 |
| | | | | 73/40 |
| 6,212,942 B1 * | 4/2001 | Hara | ............... | G01M 3/24 |
| | | | | 73/40.5 A |
| 6,435,010 B1 * | 8/2002 | Johnson | ............... | G01M 3/3236 |
| | | | | 73/40 |
| 9,669,818 B2 * | 6/2017 | Kull | ............... | G01L 5/28 |
| 2013/0325194 A1 * | 12/2013 | Brine | ............... | G05D 7/0629 |
| | | | | 700/282 |

FOREIGN PATENT DOCUMENTS

| | | | | | |
|---|---|---|---|---|---|
| CN | 104236820 | A | * | 12/2014 | |
| CN | 104406750 | A | | 3/2015 | |
| CN | 106768704 | A | * | 5/2017 | |
| CN | 106768704 | A | | 5/2017 | |
| CN | 206440441 | U | | 8/2017 | |
| CN | 107228745 | A | | 10/2017 | |
| CN | 107228745 | A | * | 10/2017 | |
| CN | 206710036 | U | | 12/2017 | |
| CN | 107576458 | A | | 1/2018 | |
| CN | 208672248 | U | | 3/2019 | |
| CN | 210741775 | U | | 6/2020 | |
| EP | 0103624 | B1 | * | 1/1988 | |
| EP | 2672246 | A1 | * | 12/2013 | ............. G01M 3/26 |
| EP | 2672246 | A1 | | 12/2013 | |
| EP | 3812731 | A1 | | 4/2021 | |
| JP | 3766997 | B2 | | 4/2006 | |
| WO | WO-8201590 | A1 | * | 5/1982 | |

OTHER PUBLICATIONS

PCT International Search Report for PCT/CN2020/101675, dated Oct. 15, 2020, 13 pages.

The extended European search report for EP Application No. 20824418.6, dated Oct. 5, 2021, 5 pages.

* cited by examiner

APPARATUS FOR DETECTING AIR TIGHTNESS

CROSS-REFERENCE TO RELATED APPLICATION

This application is a continuation of International Application No. PCT/CN2020/101675, filed on Jul. 13, 2020, which claims priority to Chinese Patent Application No. 201921291912.3, filed on Aug. 9, 2019, both of which are hereby incorporated by reference in their entireties.

TECHNICAL FIELD

The present application relates to the technical field of air tightness detection, and in particular, to an apparatus for detecting air tightness.

BACKGROUND

In some industries, leakage tests under different inflation pressures are required to be performed at the same time. For example, air tightness detection of a vehicle battery pack includes air tightness detection of a battery box and air tightness detection of a water cooling plate inside the battery box, where an inflation pressure range for the test of the battery box is from 1.5 Kpa to 8 Kpa, and an inflation pressure range for the test of the water cooling plate may be up to from 400 Kpa to 500 Kpa.

Generally, a high-precision low air pressure sensor is required for air tightness detection under low air pressure, and a high-range high air pressure sensor is required for air tightness detection under high air pressure. The two types of sensors cannot be interchangeably used, the reason for which is that the low air pressure sensor is very poor in pressure resistance and will usually be damaged when the air pressure reaches approximately 50 pa, which needs to be effectively protected during the air tightness detection under high air pressure for which the inflation pressure is usually above 100 Kpa which is far above the pressure resistance limit of the low air pressure sensor.

Currently, the low air pressure sensor and the high pressure sensor are made into two separate air tightness detectors, so as to avoid that the low air pressure sensor is damaged during the air tightness detection under high air pressure. However, those two air tightness detectors share no common parts, which doubles the cost, and it is more inconvenient to transfer and utilize two instruments than one.

SUMMARY

Embodiments of the present application provide an apparatus for detecting air tightness, which enables a low air pressure sensor to be embedded in an air tightness detector suitable for tests under high air pressure and to be effectively protected in a high air pressure environment, so that leakage tests under different inflation pressures can be implemented by one instrument. Compared with the prior art where the leakage tests under different inflation pressures are implemented by two instruments, the cost is significantly reduced, and it is more convenient to transfer and utilize one instrument than two instruments.

The embodiments of the present application provide an apparatus for detecting air tightness, which has an air inlet end, an inflating end for an object to be tested and a standard part inflating end. The apparatus includes: a pressure regulating component, where a first end of the pressure regulating component is connected to the air inlet end; a main isolating valve, where a first end of the main isolating valve is connected to a second end of the pressure regulating component, and a second end of the main isolating valve is connected to the inflating end for the object to be tested; a first bypass isolating valve, where a first end of the first bypass isolating valve is connected to a gas pipeline that is between the second end of the pressure regulating component and the first end of the main isolating valve, and a second end of the first bypass isolating valve is connected to the standard part inflating end; a second bypass isolating valve, where a first end of the second bypass isolating valve is connected to a gas pipeline that is between the second end of the main isolating valve and the inflating end for the object to be tested; a third bypass isolating valve, where a first end of the third bypass isolating valve is connected to a gas pipeline that is between the second end of the first bypass isolating valve and the standard part inflating end; a first high air pressure sensor, where a detecting end of the first high air pressure sensor is connected to a gas pipeline that is between the second end of the pressure regulating component, the first end of the main isolating valve and the first end of the first bypass isolating valve; a second high air pressure sensor, where a detecting end of the second high air pressure sensor is connected to a gas pipeline that is between the second end of the main isolating valve, the inflating end for the object to be tested and the first end of the second bypass isolating valve; a low air pressure sensor, where a detecting end of the low air pressure sensor is connected to a gas pipeline that is between the second end of the first bypass isolating valve, the standard part inflating end and the first end of the third bypass isolating valve; and a differential pressure sensor, where a first detecting end of the differential pressure sensor is connected to a second end of the second bypass isolating valve, and a second detecting end of the differential pressure sensor is connected to a second end of the third bypass isolating valve.

In an optional embodiment, the apparatus further includes a first diverting valve, a first end of the first diverting valve is connected to a gas pipeline that is between the second end of the second bypass isolating valve and the first detecting end of the differential pressure sensor, and a second end of the first diverting valve is connected to a gas pipeline that is between the second detecting end of the differential pressure sensor and the second end of the third bypass isolating valve.

In an optional embodiment, the apparatus further includes a second diverting valve, a first end of the second diverting valve is connected to the standard part inflating end, and a second end of the second diverting valve is connected to a gas pipeline that is between the second end of the first bypass isolating valve, the first end of the third bypass isolating valve and the low air pressure sensor.

In an optional embodiment, the pressure regulating component includes a first pressure regulating valve, a second pressure regulating valve and a first way-selecting valve; air pressure regulating ranges of the first pressure regulating valve and the second pressure regulating valve are different; air inlets of the first pressure regulating valve and the second pressure regulating valve are both connected to the air inlet end; an air outlet of the first pressure regulating valve is connected to a first end of the first way-selecting valve, and an air outlet of the second pressure regulating valve is connected to a second end of the first way-selecting valve; and a common end of the first way-selecting valve is connected to the first end of the main isolating valve.

In an optional embodiment, the air pressure regulating range of the first pressure regulating valve is from 100 Kpa to 500 Kpa; and the air pressure regulating range of the second pressure regulating valve is from 0 to 100 pa.

In an optional embodiment, the first way-selecting valve is a two-position three-way solenoid valve.

In an optional embodiment, the apparatus further includes a second way-selecting valve and a muffler, where a first end of the second way-selecting valve is connected to the muffler, a second end of the second way-selecting valve is connected to the common end of the first way-selecting valve, and a common end of the second way-selecting valve is connected to the first end of the main isolating valve.

In an optional embodiment, the main isolating valve is a pneumatic control valve.

In an optional embodiment, the first bypass isolating valve, the second bypass isolating valve and the third bypass isolating valve are all solenoid valves.

In an optional embodiment, an endurable pressure value of the first bypass isolating valve and/or the second bypass isolating valve is greater than a highest air pressure that the pressure regulating component is able to output.

When it is required to perform a leakage test under high air pressure, the main isolating valve, the first bypass isolating valve, the second bypass isolating valve and the third bypass isolating valve are closed, and the pressure regulating component is adjusted to make a value sensed by the first high air pressure sensor level off at a target inflation pressure value. At this time, an output end of the pressure regulating component, the first high air pressure sensor, the closed main isolating valve and the closed first bypass isolating valve constitute an inflation pressure range-maintaining gas channel. Then, the main isolating valve is opened to inflate the object to be tested. After the inflation of the object to be tested is completed, the main isolating valve is closed, and air tightness detection is performed on the object to be tested using the second high air pressure sensor, where the air tightness detection may be performed using a direct pressure method. After the test is completed, the apparatus is restored to the initial state.

When it is required to perform a leakage test under low air pressure, the main isolating valve, the first bypass isolating valve, the second bypass isolating valve and the third bypass isolating valve are closed, and the pressure regulating component is adjusted to make the value sensed by the first high air pressure sensor in the above-mentioned inflation pressure range-maintaining gas channel level off at the target inflation pressure value. Since the first high air pressure sensor is of a type that can withstand a relatively high air pressure, it will not be damaged by the high pressure outputted from the pressure regulating component at the beginning of the adjustment. However, the first high air pressure sensor is not precise enough to meet the requirements for pressure precision of leakage test under low air pressure. Then, the first bypass isolating valve is opened and the pressure regulating component is re-adjusted, so that a value sensed by the low air pressure sensor reaches the target inflation pressure value. At this time, it is determined whether the target inflation pressure value is reached according to the value sensed by the low air pressure sensor. As the air pressure has been preliminarily adjusted via the first high air pressure sensor at the previous step, after the first bypass isolating valve is opened, pressure of the gas flowing to the low air pressure sensor will not cause damage to the low air pressure sensor. At the same time, since the third bypass isolating valve is closed, the differential pressure sensor will not be damaged by overly high pressure at one end of the differential pressure sensor. Moreover, after the pressure adjustment in this step, the output air pressure meets the precision requirements of the leakage test under low air pressure. Then, the main isolating valve, the second bypass isolating valve and the third bypass isolating valve are opened to inflate the object to be tested. After the inflation is completed, an air pressure at the standard part inflating end and an air pressure at the inflating end for the object to be tested are compared with each other by the differential pressure sensor, and the leakage test under low air pressure is performed using a pressure differential method. After the test is completed, the apparatus is restored to the initial state.

It can be seen from the description of the above working process that, the apparatus enables that the low air pressure sensor and the high air pressure sensor in the prior art need not to be made into two separate air tightness detectors, and the low air pressure sensor would not be damaged during the leakage test under high pressure. That is to say, leakage tests under different inflation pressures can be implemented using one instrument. Compared with the prior art where the leakage tests under different inflation pressures are implemented by two instruments, the cost is significantly reduced, and it is more convenient to transfer and utilize one instrument than two instruments.

DESCRIPTION OF THE DRAWINGS

The present application can be better understood from the following description of specific embodiments of the present application in connection with the drawings, in which same or similar reference numbers represent same or similar features.

DETAILED DESCRIPTION

Features of various aspects of the present application and exemplary embodiments will be described in detail below. In the following detailed description, many specific details are proposed in order to provide a thorough understanding of this application.

Embodiments of the present application provide an apparatus for detecting air tightness, which enables a low air pressure sensor to be embedded in an air tightness detector suitable for tests under high air pressure and to be effectively protected in a high air pressure environment, so that leakage tests under different inflation pressures can be implemented by one instrument. Compared with the prior art where the leakage tests under different inflation pressures are implemented by two instruments, the cost is significantly reduced, and it is more convenient to transfer and utilize one instrument than two instruments.

Figure 1:
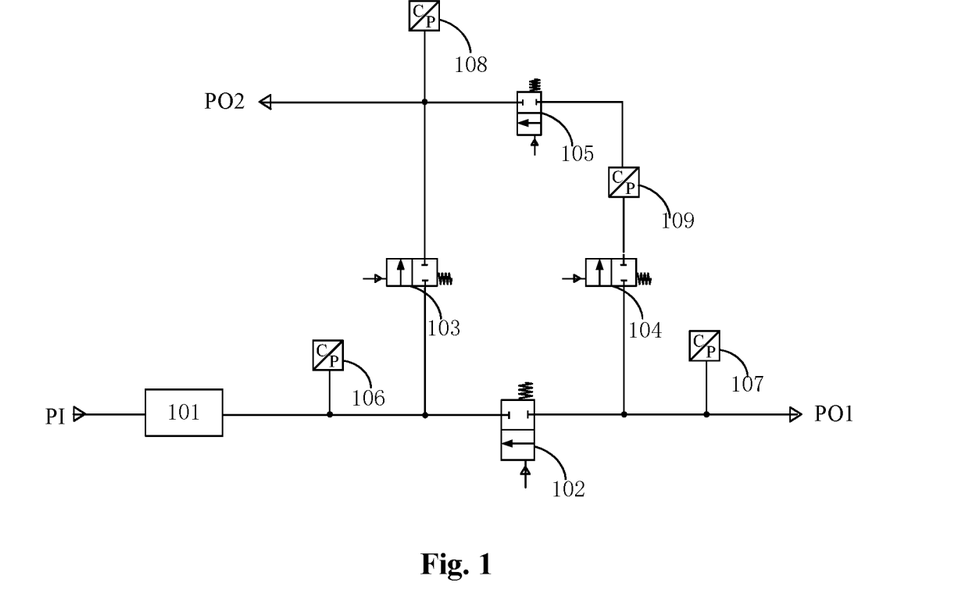
FIG. 1 is a schematic structural diagram of an apparatus for detecting air tightness according to an embodiment of the present application.

As shown in FIG. 1, the apparatus for detecting air tightness has an air inlet end PI, an inflating end for an object to be tested PO1 and a standard part inflating end PO2.

The apparatus includes: a pressure regulating component 101, where a first end of the pressure regulating component 101 is connected to the air inlet end PI; a main isolating valve 102, where a first end of the main isolating valve 102 is connected to a second end of the pressure regulating component 101, and a second end of the main isolating valve 102 is connected to the inflating end for the object to be tested PO1; a first bypass isolating valve 103, where a first end of the first bypass isolating valve 103 is connected to a gas pipeline that is between the second end of the pressure regulating component 101 and the first end of the main isolating valve 102, and a second end of the first bypass isolating valve 103 is connected to the standard part inflating end PO2; a second bypass isolating valve 104, where a first end of the second bypass isolating valve 104 is connected to a gas pipeline that is between the second end of the main isolating valve 102 and the inflating end for the object to be tested PO1; a third bypass isolating valve 105, where a first end of the third bypass isolating valve 105 is connected to a gas pipeline that is between the second end of the first bypass isolating valve 103 and the standard part inflating end PO2; a first high air pressure sensor 106, where a detecting end of the first high air pressure sensor 106 is connected to a gas pipeline that is between the second end of the pressure regulating component 101, the first end of the main isolating valve 102 and the first end of the first bypass isolating valve 103; a second high air pressure sensor 107, where a detecting end of the second high air pressure sensor 107 is connected to a gas pipeline that is between the second end of the main isolating valve 102, the inflating end for the object to be tested PO1 and a second end of the second bypass isolating valve 104; a low air pressure sensor 108, where a detecting end of the low air pressure sensor 108 is connected to a gas pipeline that is between the second end of the first bypass isolating valve 103, the standard part inflating end PO2 and the first end of the third bypass isolating valve 105; and a differential pressure sensor 109, where a first detecting end of the differential pressure sensor 109 is connected to the second end of the second bypass isolating valve 104, and a second detecting end of the differential pressure sensor 109 is connected to a second end of the third bypass isolating valve 105. The main isolating valve 102 may be a pneumatic control valve, and the first bypass isolating valve 103, the second bypass isolating valve 104 and the third bypass isolating valve 105 may be solenoid valves.

In order to help those skilled in the art to easily understand the working principles of the apparatus for detecting air tightness, the working processes of the apparatus will be described in detail below. An initial state of the apparatus will now be explained to facilitate subsequent description. The initial state of the apparatus refers to a state where the main isolating valve 102, the first bypass isolating valve 103, the second bypass isolating valve 104 and the third bypass isolating valve 105 are all closed.

When it is required to perform a leakage test under high air pressure, the main isolating valve 102, the first bypass isolating valve 103, the second bypass isolating valve 104 and the third bypass isolating valve 105 are closed. The pressure regulating component 101 is adjusted to make a value sensed by the first high air pressure sensor 106 level off at a target inflation pressure value. At this time, an output end of the pressure regulating component 101, the first high air pressure sensor 106, the closed main isolating valve 102 and the closed first bypass isolating valve 103 constitute an inflation pressure range-maintaining gas channel. Then, the main isolating valve 102 is opened to inflate an object to be tested. After the inflation of the object to be tested is completed, the main isolating valve 102 is closed, and air tightness detection is performed on the object to be tested using the second high air pressure sensor 107, where the air tightness detection method may be performed using a direct pressure method. After the test is completed, the apparatus is restored to the initial state.

When it is required to perform a leakage test under low air pressure, the main isolating valve 102, the first bypass isolating valve 103, the second bypass isolating valve 104 and the third bypass isolating valve 105 are closed, and the pressure regulating component 101 is adjusted to make the value sensed by the first high air pressure sensor 106 in the above-mentioned inflation pressure range-maintaining gas channel level off at the target inflation pressure value. Since the first high air pressure sensor 106 is of a type that can withstand a relatively high air pressure, it will not be damaged by the high pressure outputted from the pressure regulating component 101 at the beginning of the test. However, the first high air pressure sensor 106 is not precise enough to meet the requirements for pressure precision of leakage test under low air pressure. Then, the first bypass isolating valve 103 is opened and the pressure regulating component 101 is re-adjusted, so that a value sensed by the low air pressure sensor 108 reaches the target inflation pressure value. At this time, it is determined whether the target inflation pressure value is reached according to the value sensed by the low air pressure sensor 108 instead of the value sensed by the high air pressure sensor 106. As the air pressure has been preliminarily adjusted via the first high air pressure sensor 106 in the previous step, after the first bypass isolating valve 103 is opened, pressure of the gas flowing to the low air pressure sensor 108 will not cause damage to the low air pressure sensor. At the same time, since the third bypass isolating valve 105 is closed, the differential pressure sensor 109 will not be damaged by overly high pressure at one end of the differential pressure sensor. Moreover, after the pressure adjustment in this step, the output air pressure meets the precision requirements of the leakage test under low air pressure. Then, the main isolating valve 102, the second bypass isolating valve 104 and the third bypass isolating valve 105 are opened to inflate the object to be tested. After the inflation is completed, an air pressure at the standard part inflating end PO2 and an air pressure at the inflating end for the object to be tested PO1 are compared with each other by the differential pressure sensor 109, and the leakage test under low air pressure is performed using a pressure differential method. After the test is completed, the apparatus is restored to the initial state.

It can be seen from the description of the above working process that, the apparatus enables that the low air pressure sensor and the high air pressure sensor in the prior art need not to be made into two separate air tightness detectors, and the low air pressure sensor would not be damaged during the leakage test under high pressure, that is to say, leakage tests under different inflation pressures can be implemented using one instrument. Compared with the prior art where the leakage tests under different inflation pressures are implemented by two instruments, the cost is significantly reduced, and it is more convenient to transfer and utilize one instrument than two instruments.

Figure 2:
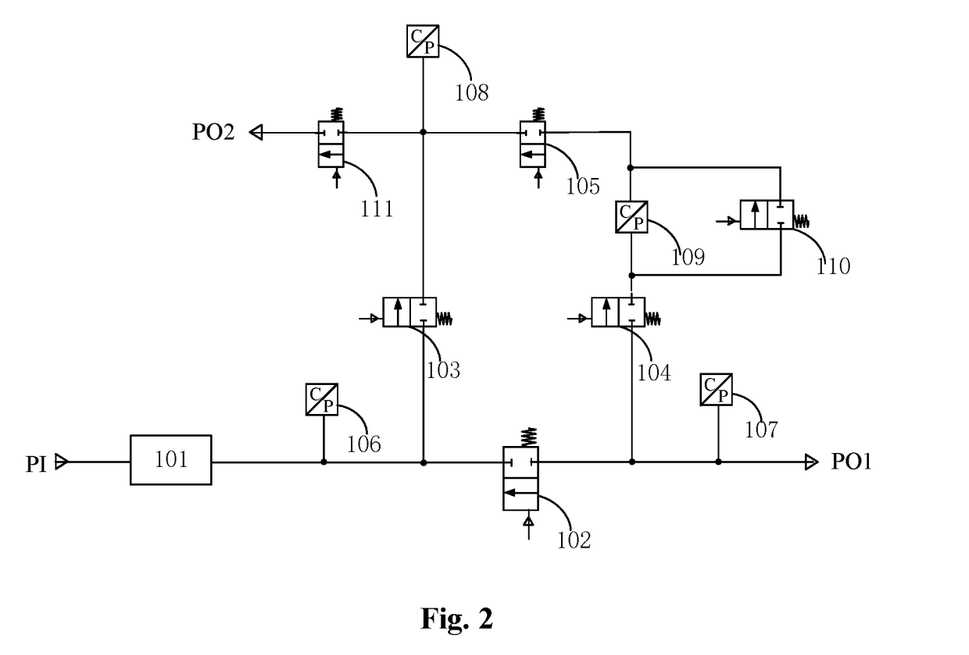
FIG. 2 is a schematic structural diagram of an apparatus for detecting air tightness according to another embodiment of the present application.

Further, as shown in FIG. 2, the apparatus may further include a first diverting valve 110. A first end of the first diverting valve 110 is connected to a gas pipeline that is between the second end of the second bypass isolating valve 104 and the first detecting end of the differential pressure sensor 109, and a second end of the first diverting valve 110 is connected to a gas pipeline that is between the second detecting end of the differential pressure sensor 109 and the second end of the third bypass isolating valve 105. During the leakage test under high air pressure, the first diverting valve 110 is always opened. When the main isolating valve 102 is opened to inflate the object to be tested, even if very small leakage occurs to the second bypass isolating valve 104, since the first diverting valve 110 is opened, the pressures at the both ends of the differential pressure sensor 109 remain the same, which ensures that the differential pressure sensor 109 will not be damaged. During the leakage test under low air pressure, the first diverting valve 110 is also always opened. When the value sensed by the low air pressure sensor 108 is adjusted to the target inflation pressure value, even if small leakage occurs to the third bypass isolating valve 105, since the first diverting valve 110 is opened state, the pressures at the both ends of the differential pressure sensor 109 remain the same, which ensures that the differential pressure sensor 109 will not be damaged. The first diverting valve 110 may be a solenoid valve.

In another optional embodiment, as shown in FIG. 2, the apparatus may further include a second diverting valve 111. A first end of the second diverting valve 111 is connected to the standard part inflating end PO2, and a second end of the second diverting valve 111 is connected to a gas pipeline that is between the second end of the first bypass isolating valve 103, the first end of the third bypass isolating valve 105 and the low air pressure sensor 108. The second diverting valve 111 may be a solenoid valve.

Figure 3:
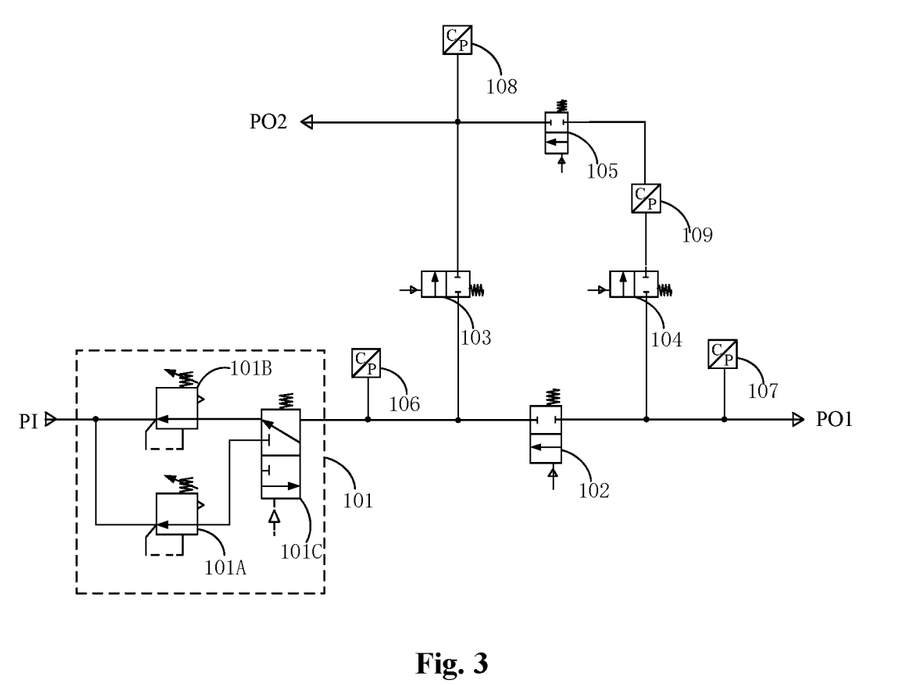
FIG. 3 is a schematic structural diagram of an apparatus for detecting air tightness according to yet another embodiment of the present application.

In addition, another optional example of the pressure regulating component 101 will be described in detail, to facilitate specific implementation by those skilled in the art. Specifically, as shown in FIG. 3, the pressure regulating component 101 includes a first pressure regulating valve 101A, a second pressure regulating valve 101B and a first way-selecting valve 101C. Air pressure regulating ranges of the first pressure regulating valve 101A and the second pressure regulating valve 101B are different. For example, the air pressure regulating range of the first pressure regulating valve 101A is from 100 Kpa to 500 Kpa, and the air pressure regulating range of the second pressure regulating valve 101B is from 0 to 100 pa. The adjustable range of the first pressure regulating valve 101A is relatively large, but it is not precise enough in respect of a low air pressure situation. The adjustable range of the second pressure regulating valve 101B is relatively small, but it is relatively precise in respect of a low air pressure situation. That is to say, coarse air-pressure adjustment can be realized by the first pressure regulating valve 101A, and fine air-pressure adjustment can be realized by the second pressure regulating valve 101B. An air outlet of the first pressure regulating valve 101A is connected to the first end of the first way-selecting valve 101C, and an air outlet of the second pressure regulating valve 101B is connected to a second end of the first way-selecting valve 101C; and a common end of the first way-selecting valve 101C is connected to the first end of the main isolating valve 102. In this situation, the first way-selecting valve 101C is connected to the first pressure regulating valve 101A when the leakage test under high air pressure is performed, and the first way-selecting valve 101C is connected to the second pressure regulating valve 101B when the leakage test under low air pressure is performed. The first way-selecting valve 101C may be a two-position three-way solenoid valve.

Figure 4:
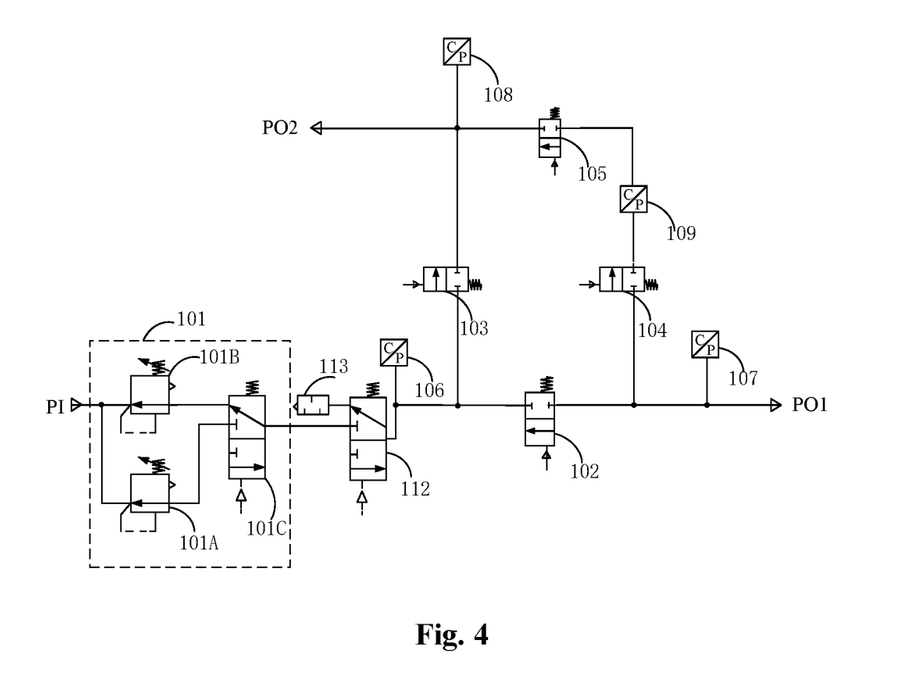
FIG. 4 is a schematic structural diagram of an apparatus for detecting air tightness according to yet another embodiment of the present application.

Furthermore, as shown in FIG. 4, the apparatus may further include a second way-selecting valve 112 and a muffler 113. A first end of the second way-selecting valve 112 is connected to the muffler 113, a second end of the second way-selecting valve 112 is connected to the common end of the first way-selecting valve 101C, and a common end of the second way-selecting valve 112 is connected to the first end of the main isolating valve 102.

In a preferable embodiment, an endurable pressure value of the first bypass isolating valve 103 and/or the second bypass isolating valve 104 is greater than the highest air pressure that the pressure regulating component 101 is able to output. Therefore, the first bypass isolating valve 103 and the second bypass isolating valve 104 are not liable to be damaged during the leakage test under high pressure and the leakage test under low pressure.

Figure 5:
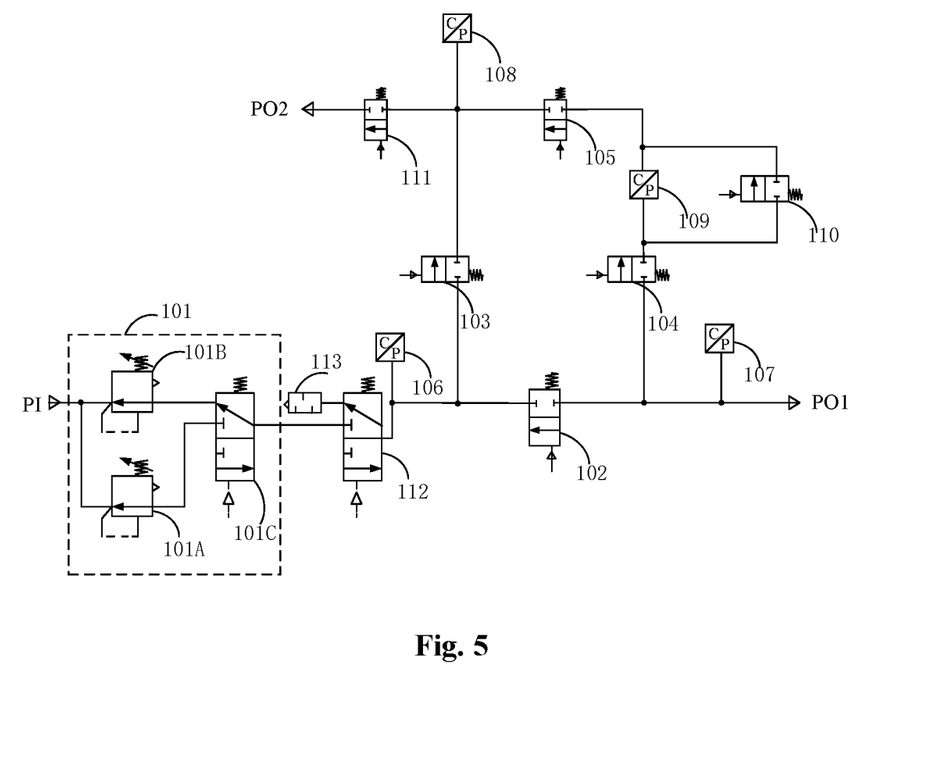
FIG. 5 is a schematic structural diagram of an apparatus for detecting air tightness according to yet another embodiment of the present application.

In addition, FIG. 5 illustrates a combination of the foregoing embodiments, which will be described in detail below.

First, an initial state of the system is set. In the initial state, the first way-selecting valve 101C is connected to the second pressure regulating valve 101B, the second way-selecting valve 112 is connected to the muffler 113, the main isolating valve 102, the first bypass isolating valve 103, the second bypass isolating valve 104 and the third bypass isolating valve 105 are closed, and the first diverting valve 110 and the second diverting valve 111 are opened.

In the leakage test under high air pressure, following steps are taken.

At step A1, the main isolating valve 102, the first bypass isolating valve 103, the second bypass isolating valve 104 and the third bypass isolating valve 105 are closed, the first diverting valve 110 and the second diverting valve 111 are opened, the first way-selecting valve 101C is connected to the first pressure regulating valve 101A, and the second way-selecting valve 112 is connected to the common end of the first way-selecting valve 101C.

At step A2, the air pressure of the first pressure regulating valve 101A is adjusted to make the value sensed by the first high air pressure sensor 106 level off at the target inflation pressure. At this time, the first high air pressure sensor 106, the output end of the first pressure regulating valve 101A, the first way-selecting valve 101C, the second way-selecting valve 112, the closed first bypass isolating valve 103, the closed main isolating valve 102 and the gas channel between these components constitute the above-mentioned inflation pressure range-maintaining gas channel. The highest output air pressure of the first pressure regulating valve 101A is Pmax1, and the endurable pressure value of the first high air pressure sensor 106 is greater than Pmax1.

At step A3, the main isolating valve 102 is opened to inflate the object to be tested, the main isolating valve 102 is closed after the inflation is completed, and then air tightness detection is performed on the object to be tested using the second high air pressure sensor 107 through the direct pressure method. The endurable pressure value of the second bypass isolating valve 104 is greater than Pmax1 and is closed, and the high pressure airflow will not flow into the differential pressure sensor 109. Even if a very small leakage occurs to the second bypass isolating valve 104, since the first diverting valve 110 is opened, the pressures at the both ends of the differential pressure sensor 109 are the same, thus the differential pressure sensor 109 will not be damaged.

At step A4, the system is restored to the initial state after the test is completed.

In the leakage test under low air pressure, following steps are taken.

At step B1, the main isolating valve 102, the first bypass isolating valve 103, the second bypass isolating valve 104 and the third bypass isolating valve 105 are closed, the first diverting valve 110 and the second diverting valve 111 are opened, the first way-selecting valve 101C is connected to the second pressure regulating valve 101B, and the second way-selecting valve 112 is connected to the common end of the first way-selecting valve 101C.

At step B2, the second pressure regulating valve 101B is adjusted to make the value presented by the first high air pressure sensor 106 in the above-mentioned inflation pressure range-maintaining gas channel be the target inflation pressure value. Since the first high air pressure sensor 106 is of type than can withstand high pressure, it will not be damaged by the overly high pressure outputted from the second pressure regulating valve 101B at the beginning of the adjustment. However, the first high air pressure sensor 106 is not precise enough to meet the requirements for pressure precision of the leakage test under low air pressure.

At step B3, the first bypass isolating valve 103 is opened, and the second pressure regulating valve 101B is re-adjusted to make the value presented by the low air pressure sensor 108 be the target inflation pressure value. At this time, the value presented by the first high air pressure sensor 106 is no longer taken into consideration. As the air pressure has been preliminarily adjusted at the previous step, after the first bypass isolating valve is opened, pressure of the gas flowing to the low air pressure sensor will not cause damage to the low air pressure sensor. Moreover, since the low air pressure sensor 108 is of a high-precision type, after the pressure adjustment at this step, the output air pressure of the apparatus can meet the precision requirements of the leakage test under low air pressure. In addition, at this step, the third bypass isolating valve 105 is closed and the first diverting valve 110 is opened, and therefore, the both ends of the differential pressure sensor 109 will not be damaged by overly high pressure at one end.

At step B4, the main isolating valve 102, the second bypass isolating valve 104 and the third bypass isolating valve 105 are opened, the first diverting valve 110 is kept not closed for a while, so as to avoid overly large pressure difference between the both ends of the differential pressure sensor 109 which otherwise would damage the differential pressure sensor 109, then the object to be tested is inflated, after the inflation is completed, the first diverting valve 110 is closed, and then the leakage test under low air pressure is performed using a pressure differential method through the differential pressure sensor 109.

At step B5, the apparatus is restored to the initial state after the test is completed.

It should be clear that the respective embodiments in the specification are described in a progressive way, and the same or similar parts of each embodiment can be referred to each other. The description of each embodiment focuses on the differences with other embodiments. In the embodiments of the apparatuses, the corresponding parts can refer to the description sections of the embodiments of the methods. The embodiments of present application are not limited to the specific structures described above and shown in the drawings. Those skilled in the art can make various changes, modifications and additions after understanding the gist of the present application. Moreover, for the sake of brevity, the detailed description of known processes and techniques is omitted.

The embodiments of the present application can be implemented in other specific forms without departing from its gist or essential characteristics. For example, an algorithm described in a specific embodiment can be modified without the system architecture departing from the basic gist of the embodiments of the present application. Therefore, all aspects of the current embodiments are considered to be exemplary rather than limiting. The scope of the embodiments of the present application is defined by the appended claims rather than the above description. All modifications falling within the meaning of the claims and equivalents are included in the scope of the embodiments of the present application.

Those skilled in the art should understand that the above-mentioned embodiments are all exemplary instead of restrictive. Different technical features appearing in different embodiments can be combined to obtain beneficial effects. Those skilled in the art should be able to understand and implement other modified embodiments of the disclosed embodiments on the basis of studying the drawings, the description, and the claims. In the claims, the term "including" does not exclude other devices or steps; the indefinite article "a" or "an" does not exclude a plurality; the terms "first" and "second" are used to indicate names and not to indicate any particular order. Any reference signs in the claims should not be construed as limiting the scope of protection. The functions of several parts appearing in the claims can be realized by a single hardware or software module. The presence of certain technical features in different dependent claims does not mean that these technical features cannot be combined to obtain beneficial effects

What is claimed is:

1. An apparatus for detecting air tightness, having an air inlet end, an inflating end for an object to be tested and a standard part inflating end, the apparatus comprising:
    a pressure regulating component, wherein a first end of the pressure regulating component is connected to the air inlet end;
    a main isolating valve, wherein a first end of the main isolating valve is connected to a second end of the pressure regulating component, and a second end of the main isolating valve is connected to the inflating end for the object to be tested;
    a first bypass isolating valve, wherein a first end of the first bypass isolating valve is connected to a gas pipeline that is between the second end of the pressure regulating component and the first end of the main isolating valve, and a second end of the first bypass isolating valve is connected to the standard part inflating end;
    a second bypass isolating valve, wherein a first end of the second bypass isolating valve is connected to a gas pipeline that is between the second end of the main isolating valve and the inflating end for the object to be tested;
    a third bypass isolating valve, wherein a first end of the third bypass isolating valve is connected to a gas pipeline that is between the second end of the first bypass isolating valve and the standard part inflating end;
    a first high air pressure sensor, wherein a detecting end of the first high air pressure sensor is connected to a gas pipeline that is between the second end of the pressure regulating component, the first end of the main isolating valve and the first end of the first bypass isolating valve;
    a second high air pressure sensor, wherein a detecting end of the second high air pressure sensor is connected to a gas pipeline that is between the second end of the main isolating valve, the inflating end for the object to be tested and the first end of the second bypass isolating valve;

a low air pressure sensor, wherein a detecting end of the low air pressure sensor is connected to a gas pipeline that is between the second end of the first bypass isolating valve, the standard part inflating end and the first end of the third bypass isolating valve; and a differential pressure sensor, wherein a first detecting end of the differential pressure sensor is connected to a second end of the second bypass isolating valve, and a second detecting end of the differential pressure sensor is connected to a second end of the third bypass isolating valve.

2. The apparatus according to claim 1, further comprising a first diverting valve, wherein a first end of the first diverting valve is connected to a gas pipeline that is between the second end of the second bypass isolating valve and the first detecting end of the differential pressure sensor, and a second end of the first diverting valve is connected to a gas pipeline that is between the second detecting end of the differential pressure sensor and the second end of the third bypass isolating valve.

3. The apparatus according to claim 1, further comprising a second diverting valve, a first end of the second diverting valve is connected to the standard part inflating end, and a second end of the second diverting valve is connected to a gas pipeline that is between the second end of the first bypass isolating valve, the first end of the third bypass isolating valve and the low air pressure sensor.

4. The apparatus according to claim 1, wherein the main isolating valve is a pneumatic control valve.

5. The apparatus according to claim 1, wherein the first bypass isolating valve, the second bypass isolating valve and the third bypass isolating valve are all solenoid valves.

6. The apparatus according to claim 1, wherein an endurable pressure value of the first bypass isolating valve and/or the second bypass isolating valve is greater than a highest air pressure that the pressure regulating component is able to output.

7. The apparatus according to claim 1, wherein the pressure regulating component comprises a first pressure regulating valve, a second pressure regulating valve and a first way-selecting valve;

air pressure regulating ranges of the first pressure regulating valve and the second pressure regulating valve are different;

air inlets of the first pressure regulating valve and the second pressure regulating valve are both connected to the air inlet end;

an air outlet of the first pressure regulating valve is connected to a first end of the first way-selecting valve, and an air outlet of the second pressure regulating valve is connected to a second end of the first way-selecting valve; and a common end of the first way-selecting valve is connected to the first end of the main isolating valve.

8. The apparatus according to claim 7, wherein, the air pressure regulating range of the first pressure regulating valve is from 100 Kpa to 500 Kpa; and the air pressure regulating range of the second pressure regulating valve is from 0 to 100 pa.

9. The apparatus according to claim 7, wherein the first way-selecting valve is a two-position three-way solenoid valve.

10. The apparatus according to claim 9, further comprising a second way-selecting valve and a muffler, wherein a first end of the second way-selecting valve is connected to the muffler, a second end of the second way-selecting valve is connected to the common end of the first way-selecting valve, and a common end of the second way-selecting valve is connected to the first end of the main isolating valve.

* * * * *

UNITED STATES PATENT AND TRADEMARK OFFICE
CERTIFICATE OF CORRECTION

| | | |
|---|---|---|
| PATENT NO. | : 11,598,690 B2 | Page 1 of 1 |
| APPLICATION NO. | : 17/134567 | |
| DATED | : March 7, 2023 | |
| INVENTOR(S) | : Linjun Huang et al. | |

It is certified that error appears in the above-identified patent and that said Letters Patent is hereby corrected as shown below:

On the Title Page

Item (72) Inventors:
Please delete "Darning ZHOU" and insert -- Daming ZHOU -- therefor.

Signed and Sealed this
Eleventh Day of April, 2023

Katherine Kelly Vidal
*Director of the United States Patent and Trademark Office*